July 20, 1965    R. J. CULBERTSON    3,196,272
TIME CONSTANT CONTROL SYSTEM FOR X-RAY ANALYZERS AND GAGES
Filed Sept. 5, 1962

INVENTOR.
ROBERT J. CULBERTSON
BY
ATTORNEY 3,196,272
TIME CONSTANT CONTROL SYSTEM FOR
X-RAY ANALYZERS AND GAGES
Robert J. Culbertson, Brookfield, Wis., assignor to General
Electric Company, a corporation of New York
Filed Sept. 5, 1962, Ser. No. 221,466
10 Claims. (Cl. 250—83.3)

This invention pertains to instruments for determining the characteristics of a test sample such as its thickness, the quantity and identity of the chemical elements of which it is composed, its atomic lattice structure or the like. The invention is primarily useful in instruments that excite a sample with electrons, or X-rays and gamma rays in the course of conducting emission, diffraction, and absorption analysis procedures and in thickness gaging. The principles and an embodiment of the invention will be discussed primarily in connection with an X-ray emission analyzer or spectrograph. In its broadest sense, however, the invention is useful in any case where an electric signal of given value serves as a sample characteristic indicator and where the information originating phenomenon varies statistically. A specific example is in connection with a radiation counting ratemeter circuit.

X-ray emission spectographs are used to measure the percentage of various elements present in an unknown sample. Two fundamental modes of operation are common. In the first called "process analyzing," a continuous stream of unknown sample is passed through the spectograph and the quantity of elements present are continuously read out on chart recorders or electric meters. The readings correspond with an output voltage that is an analog of the corresponding element quantity. A practical example is wherein a plant that makes Portland cement, the constituent compounds of a dry cement mix are continuously analyzed for amounts of aluminum, silicon, iron and calcium. Variations of the quantities of these elements from their desired levels require that the operator change the amount of the compounds that contain the elements being introduced into the mix. In this way the mix is subject to continuous analysis and composition control.

In the second mode, unknown samples are individually prepared and consecutively admitted to the spectrograph for analysis. The readout method and devices may be the same as in the first case. When operating in either mode, the output signals from the analyzing apparatus may be fed into an electronic data processor that controls equipment which makes changes in the process as needed.

In either of these procedures or modes of operation, the sample changes continuously or at closely spaced intervals but it is not useful to read out the instantaneous values of the unknown elements immediately after a change because it is necessary to wait until the output signals have reached a new equilibrium level that permits desired readout precision. The reasons for this behaviour are well known. When a sample is placed in a primary X-radiation beam, as in the X-ray spectrograph, and the elements are excited to emit X-radiation whose quantum or photon energy is characteristic of the element of interest, the photons are emitted at random as to time and direction so precision depends on a long counting interval that averages out the random effects. Each intercepted photon causes an electric pulse to be produced by a radiation detector which may be of the solid state type or, more commonly, a Geiger, proportional or scintillation counter tube. Suitable monochromating devices are tuned to select photons that are essentially monoenergetic and to direct them to a counter tube whereupon the amplitude of the pulses produced thereby is dependent upon the kind of chemical element present in the sample and the pulse rate is indicative of the intensity of the characteristic radiation, and correspondingly, on the quantity in the sample.

The number of pulses for a given time interval can be counted in a conventional scaler and the counts per second may be correlated with the quantity of the element in the sample to provide the analytical information desired. Alternately, the pulses may be integrated to produce a voltage that is an analog of and that varies in magnitude with the quantity of element present in the sample.

Conversion to an analog voltage is usually done with a ratemeter. This instrument integrates incoming pulses and amplifies the voltage so produced to yield the output analog voltage. Because production of X-ray quanta or photons from the sample elements is a random process, the resulting counter pulses are also random rather than continuous and at a uniform rate as would be desirable. At any given moment, then, the analog voltage would not indicate the element quantity with the desired precision. This effect is minimized by integrating the incomng pulses in a resistor-capacitor circuit that has a predetermined time constant. Thus, the output voltage at any given time results from the counting of more pulses and the effect of statistical variations is reduced to some extent. With a comparatively short time constant, the statistical variations are manifested as a jagged line that swings to both sides of a mean line on a pen chart recorder displaying the voltage. One desiring to read the chart may roughly estimate the mean line or be satisfied with a determination that the element quantity lies between limits of the jagged line peaks.

Greater precision is obtained with longer time constants in which case more pulses are counted over an interval and the swings of the pen in the chart recorder become less pronounced. With high pulse rates, such as are incident to analysis of high atomic number elements that yield many high energy pulses per second, the pen scribes a rather straight line, making readout easier and more precise.

When analyzers of the type here under discussion are continuously operating on a process line it is necessary to substitute periodically a standard sample for the unknown sample in order to check the accuracy of the output. A standardizer for an X-ray emission analyzer is fully described in the co-pending application of A. D. Furbee; filed November 6, 1961; Serial No. 150,387; assigned to the assignee of the instant invention. The standardizer inserts a known sample in the exciting X-ray beam for a given time and all element channels are read out. An electronic comparison is made between what the analyzer reads and what it should read, and if there is any discrepancy, an automatic correction of the analyzer is made. If short time constants were permissible the standard sample could be read out and the analyzer restored to production analysis without undue delay. But in order to get desired precision from the standard sample, as many as five time constants may be allowed to elapse and this means that where the time constant is ten or eleven minutes, as it is in some channels, an hour is lost before equilibrium and final precision is reached. Likewise, when the analyzer is restored to process line analyzing, another long delay must be accepted after standardizing before the operator can read the analyzer with reasonable precision.

Similar conditions prevail when individual samples are consecutively analyzed. Each sample has required a long delay before any reading could be taken because one had to wait for the exponential time constant curve to reach its plateau before an approximate reading could be taken and then wait five times as long for a reading at the desired final precision.

The main object of this invention is to improve radiation gaging and analyzing apparatus by overcoming the above noted problems.

A more specific object is to provide radiation gaging and analyzing apparatus with means for more rapidly responding to and indicating changes in the condition of a sample.

A particular object is the provision of means for changing the time constant of the instrument during the course of processing a particular sample so that earlier readout and increasingly better precision will be permitted.

Achievement of the foregoing and other more specific objects will appear from time to time in the ensuing description of an illustrative embodiment of the invention taken in conjunction with the drawings in which.

Figures 1, 2, 3:
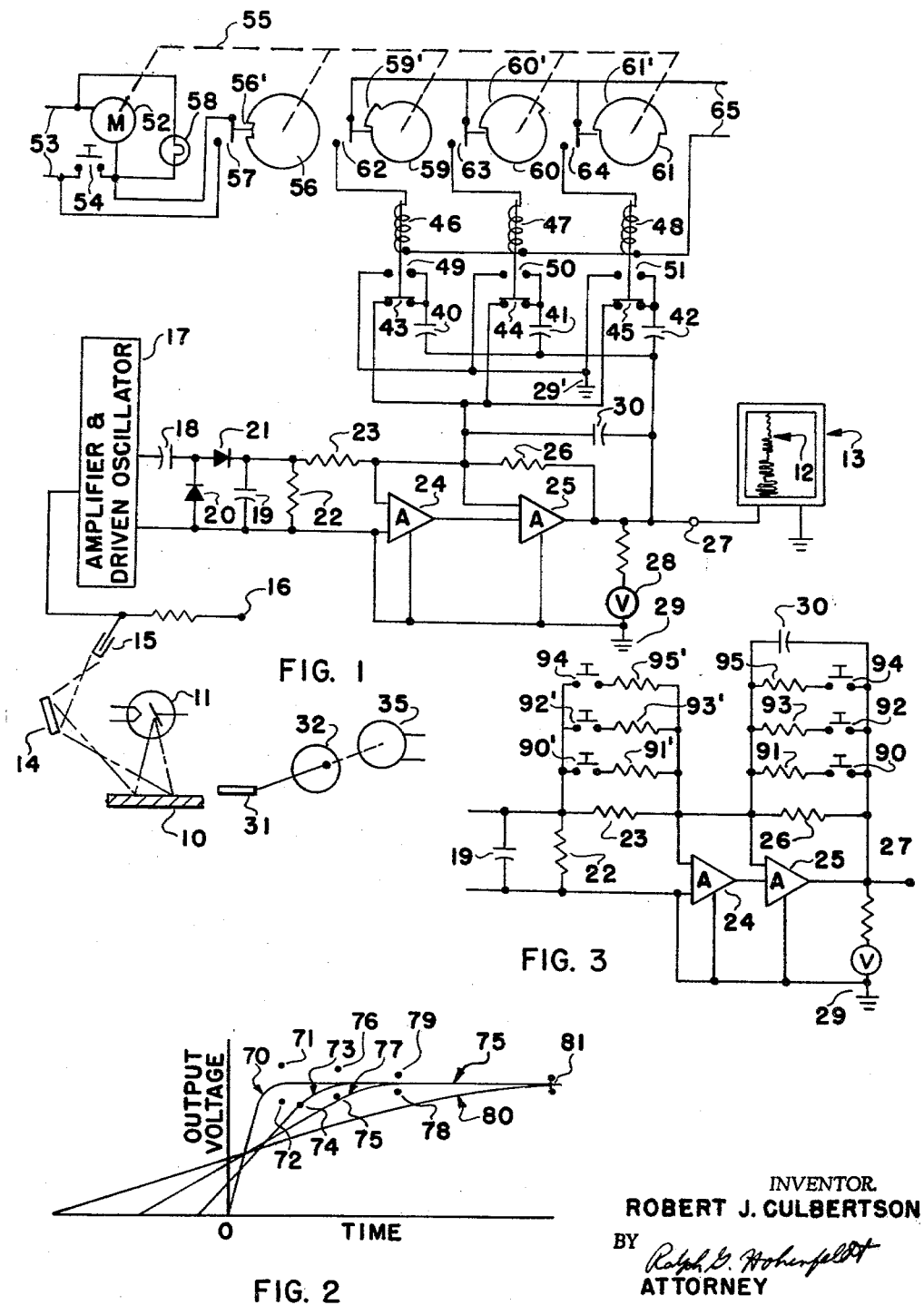
FIG. 1 is a schematic diagram of an X-ray spectrograph or analyzer that embodies the invention.
FIG. 2 is a graph of the output signal voltages obtained from the instrument for various time constants.
FIG. 3 is an alternative form of time constant variation circuit.

FIG. 1 depicts one channel of a multi-channel X-ray emission analyzer. A complete analyzer may be seen in the above cited application of A. D. Furbee. In FIG. 1 there is a test sample 10 disposed in the primary beam from an X-ray tube 11. Radiation that is representative of the quantity of an element present in the sample is converted in the system to an analog voltage which appears as a line 12 scribed on the paper of a chart recorder 13. By previously calibrating the chart readings with a known sample, the location of the line 12 can be used for determining the quantity of an element present in an unknown sample.

Sample 10 may be arranged to emit secondary radiation or transmit primary radiation from X-ray tube 11. The sample may be solid sheet material, a liquid, a powder or a slurry. The sample 10 may be continuously passed through the X-ray beam as in a trough, pipe or conveyer or samples may be introduced consecutively for individual analysis.

Radiation that is characteristic of the several elements in the sample is intercepted by an analyzing crystal 14 that may be of a material chosen according to criteria well known to those versed in the art. The analyzing crystal 14 diffracts monoenergetic radiation that is characteristic of one element, or in a sense, it selects monoenergetic photons which are directed to a radiation detector 15 that is preferably a Geiger-Müller counter of the proportional type. The direct current powder supply for the proportional counter tube is not shown but would be connected through a decoupling resistor at terminal 16. By well known phenomenon, the individual X-ray quanta or photons intercepted by counter tube 15 cause it to emit discrete electric pulses on the order of one or two microseconds duration and at a rate dependent upon the intensity of the X-radiation, and accordingly, the quantity of the element present in the sample.

In this example, the pulses are conducted to an amplifier and driven oscillator which in combination bears the reference numeral 17. As explained in the cited application, the incoming pulses arrive at amplifier-oscillator 17 at a random rate and with some variations in their amplitude. The oscillator, which may be termed a monostable multivibrator, is adapted to emit a pulse of uniform height and duration for every incoming pulse from the detector 15. The pulses of uniform amplitude and random rate are fed into a diode pump circuit, which is of the RC variety, and includes capacitors 18 and 19, diodes 20 and 21, and a resistor 22 that forms a short time constant circuit with capacitor 19.

The diode pump is adapted to convert constant amplitude random pulses to a continuous readout voltage that is proportional to a pulse repetition rate. In the presence of a pulse, capacitors 18 and 19 in series charge on the positive portion of the pulse through diode 21, and during the interval between two consecutive pulses, diode 20 conducts and discharges capacitor 18. For capacitor 19 to have an average voltage on it corresponding with the rate of incoming pulses, it must discharge through a resistor 22 between incoming pulses. The time constant of this RC combination may lie in the range of a couple of microseconds to the low millisecond level. A low number of counts requires high resistance while a high count rate requires a low resistance for resistor 22 in order to hold capacitor 19 at the desired potential level.

The D.-C. voltage appearing across resistor 22 may pass through a filter circuit, which is omitted, and then through a resistor 23 to a chopper stabilized operational amplifier 24, 25. The operational amplifier is stabilized by a feedback resistor 26 which also forms part of another time constant circuit to be discussed momentarily. Thus, the gain of the operational amplifier becomes a function of resistors 23 and 26. The output point of the operational amplifier is designated 27.

The circuit elements beginning with amplifier 17 and ending with output terminal 27 are collectively designated a counting ratemeter. The ratemeter analog output voltage may be read directly on a voltmeter 28 which is connected between ratemeter ground point 29 and the output line as shown. In a commercial device, voltmeter 28 has a 10 volt scale and the circuitry is adjusted so that the voltmeter usually reads between 5 and 10 volts while the analyzer is operating. The ratemeter output is also recorded on a chart recorder 13 whose pen scribes a line 12 whose distance from the left margin of the recording paper, we may arbitrarily assume, represents the amount of the element present in the sample. In practice, recorders having single charts and multiple pens are also used so that a number of different outputs can be recorded on the chart. In a multichannel analyzer, there is, of course, an individual record for each element channel output. More details on an appropriate ratemeter may be seen in the article of Kip et al., Design and Operation of an Improved Counting Ratemeter, Rev. Sci. Inst., vol. 17, No. 9, September 1946, pp. 323–333. A chopper stabilized amplifier 24, 25 may be seen in the book, H. J. Reich, Functional Circuis and Oscillators, 1961, D. Van Nostrand Co., pp. 22–24.

The output from ratemeter terminal 27 may also be fed to a computer that controls the process under which sample 10 is being treated.

Across the D.-C. amplifier section 25 of the chopper stabilized operational amplifier 24, 25, there is connected the time constant and feedback resistor 26 in parallel with a time constant capacitor 30. Capacitor 30 is built into the ratemeter and permanently connected. In a commercial device, the combination of capacitor 30 and resistor 26 has a time constant of about 5 seconds. With such a short time constant, and especially at low pulse rates, the statistical variations are manifested undesirably on the chart recorder as is evident by the large amount of jiggle at the bottom end of scribed line 12. If the channel is being used to read out the quantity of an element whose atomic number is high, the element will ordinarily have a high pulse count rate which obscures the statistical variations and results in a line 12 that has less jiggle when read on chart recorder 13. Whenever there is a drastic change in the element quantity in sample 10 or if individual samples are presented to the X-ray beam from tube 11, it is desirable to permit five time constants of the RC combination 26, 30 to elapse before the gage stabilizes sufficiently to make a sensible reading from line 12. Of course, the jiggle can be reduced by increasing the time constant of the capacitor 30-resistor 26 combination and this will result in less jiggle of line 12 but it will require a greater waiting period before the analyzer channel reaches its maximum stable output level.

With the construction thus far described, the analyzer is also caused to be insufficiently precise whenever the standardizing process takes place and immediately following it. During standardizing, a sample 31 is temporarily interposed in the beam from X-ray tube 11 and an element corresponding to one of those in the sample 10 is read out. The standard sample may be inserted on a schedule with a crank 32 and motor 35 mechanism that is symbolized in FIG. 1. The timer for controlling motor 35 is not shown.

In a multichannel commercial form of the analyzer, about one hour is required to standardize all channels because about five time constants must elapse before desired readout precision is reached in the longest time constant channel. Channels that read out weak radiation from low atomic number elements such as aluminum and silicon may have time constants around 10 minutes during normal gage operation, thus accounting for the one hour delay in standardizing. Although the analyzer may be standardized only once in two or three eight-hour shifts, it is effectively removed from the process line under prior practice for the equivalent of two hours because there is another delay before stability of readout is reached after the standard sample 31 is removed and analysis of unknown sample 10 is continued. It is to allow earlier readout with reasonable and increasing precision that the present invention has been devised.

In accordance with one embodiment of the invention, the time constants of the ratemeter are changed by switching on and off capacitors that are located in a capacitor bank that may be external to the ratemeter. When the capacitors are switched off of the ratemeter external connection, they are connected across the ratemeter output, so they will always be charged to the proper value and be ready for connection in the time constant circuit. The time constant control operates by starting the ratemeter with a short time constant, and then successively switches in longer time constants until the final time constant is reached. In this manner, the ratemeter rapidly reaches the desired output level by running with a short time constant and the statistical fluctuations are removed by the step-by-step addition of longer time constants.

In FIG. 1 there are provided three capacitors 40, 41 and 42, which as shown, are connected in parallel with fixed internal capacitor 30 as would be the case during normal analyzer operation. These capacitors are paralleled with capacitor 30 through normally closed contacts 43, 44 and 45 on relays whose operating coils are respectively designated 46, 47 and 48. It is evident that during normal operation when capacitors 40, 41, 42 and 30 are paralleled, that the time constant of the ratemeter will be longest and that the statistical fluctuations manifested by jiggle of line 12 on the chart recorder will be nearly imperceptible.

Through normally open contacts 49, 50 and 51, it is also possible to connect capacitors 40, 41 and 42, directly across the ratemeter output in order to pre-charge these capacitors for reasons which will be explained. With the normally open contacts 49, 50 and 51 closed, it will be seen that the corresponding capacitors are connected between the effective ratemeter ground point 29' and the output terminal 27 at which time capacitors 40, 41, 42 are pre-charged.

The time constant control includes a synchronous timer motor 52 that may be supplied from a 115 volt A.-C. power line 53. Alteration of the ratemeter time constant commences with energization of timer motor 25 concurrently with substitution of different samples 10 or the standard sample 31 in the X-ray beam. The timer motor is energized by depressing a start pushbutton 54 or by other control contact closure which completes the circuit between the motor and power line 53. On the shaft of motor 52, symbolized by the broken line 55, there are provided a number of cams the first of which 56 begins rotation concurrently with the others and closes a switch 57 constituting a holding circuit in parallel with pushbutton 54. Depending upon the time constant requirements of the particular analyzer, the motor 52 may run one minute to one hour. While the motor 52 is running during the time constant changing operation, the motor circuit also energizes a lamp 58 that serves to indicate that the analyzer has not reached its stable output level in that channel. When cam 56 makes a complete revolution and the motor 52 stops, lamp 58 is extinguished.

On motor shaft 55 there are also fixed three additional cams 59, 60 and 61 which are shown stopped at angular positions corresponding with those that prevail during normal analyzer operation. The cams are respectively adapted to control single pole switches 62, 63 and 64. Each cam is provided with a riser 59', 60', and 61' respectively so that when they rotate slightly counterclockwise from their shown angular positions, their associated switches 62, 63 and 64 respectively are caused to close and energize relay coils 46, 47 and 48 simultaneously from a low voltage D.C. power supply line 65.

Attention is focussed on cam 59, which like the others, is depicted in its angular position corresponding with normal production operation of the analyzer. Upon initiation of timer motor 52, cam 59 rotates slightly counterclockwise whereupon its riser portion 59' takes effect and closes switch 62. This energizes relay coil 46, opens normally closed contact 43 and closes the circuit through normally open contact 49 for pre-charging capacitor 40 across ratemeter output 27 and its ground point 29'. Assuming that a different sample has been substituted in the X-ray beam, the time constant first in effect will be that of the fixed capacitor 30 and resistor 26 combination. As an example from a practical case, capacitor 30 may be 0.25 microfarad which in combination with a 20 megohm value for resistor 26 yields a time constant of about 5 seconds. At the beginning of a time constant control interval, capacitor 30 is the only one connected across the ratemeter and this condition prevails for about 25 seconds or five of its time constants. It will be observed that when cams 60 and 61 began rotation with cam 59, external capacitors 41 and 42 were disconnected from the ratemeter input along with capacitor 40 and all the capacitors were connected across the ratemeter output for being pre-charged by the output when internal capacitor 30 is in the ratemeter circuit alone.

The 25-second delay, during which capacitor 30 is the only one producing the time constant, is obtained and controlled by the arcuate length of riser 59' on cam 59. As the timer motor continues to drive cam 59 counterclockwise, however, switch 62 is reopened and relay 46 is de-energized to reclose contact 43 while contacts 44 and 45 remain open. When 43 is closed, capacitor 40 is connected in parallel with time constant resistor 26 and capacitor 30 across what is denominated the ratemeter input and which is the equivalent of the input to D.C. amplifier 24, 25. With capacitors 40 and 30 in parallel a new and longer time constant obtains and the jiggle of line 12 is reduced, thereby making readout easier and more precise.

Concurrently with the foregoing events, cam 60 has also been rotating with 59 and it will be evident that its switch 63 has been closed. This means that capacitor 41 associated with it has been pre-charged to the voltage output level that prevailed with capacitors 30 and 40 connected in parallel. Hence, capacitor 41 need not be charged from zero potential level because it is pre-conditioned for taking over where the preceding capacitor connected in the circuit left off.

As cam 60 continues to rotate, it eventually reaches the drop-off point of its riser 60', whereupon switch 63 reopens to de-energize relay coil 47. Upon this event, capacitor 41 is disconnected from the ratemeter output and connected across its input by virtue of contact 44 closing. Thus, capacitors 40, 41 and 30 are now in parallel with time constant resistor 26. The time constant prevailing when capacitor 40 was connected in parallel with capacitor 30 is around 25 seconds in a practical case, capacitor 40 having about 1 microfarad capacitance. Because of the capacitor pre-charging, it is only necessary to let capacitor 40 remain in the circuit by itself for about two time constants or around 45 seconds. Capacitor 41, on the other hand, has a capacity of four microfarads and yields a time constant of 95 seconds in combination with the others that are previously connected to the line. When cam 60 rotates sufficiently to connect capacitor 41 in parallel with the others, excepting 42, capacitor 41 is maintained for a total time of about three minutes before cam 61 takes over.

In the same practical case, the third capacitor 42 has a capacitance of 30 microfarads and a time constant of around 11 minutes in conjunction with resistor 26 and the other capacitors 40 and 41. It is disconnected from its pre-charged condition due to being connected to the output of the ratemeter by re-closure of contact 45 which connects capacitor 42 as an integrating capacitor in parallel with 40, 41 and 30. Capacitor 42 may be used for 10 minutes of operating time during a cycle of timer motor 52 and it continues to remain in circuit with the input of the ratemeter along with the other capacitors during normal analyzer operation.

It is seen, therefore, that with continued rotation of cams 59, 60 and 61, eventually all capacitors 40, 41, 42 and 30 are in parallel and contributing to the time constant. These cams rotate with holding circuit cam 56 until they reach their positions shown in the drawing upon which event switch 57 opens due to its groove 56′ reaching its illustrated position and the time motor is de-energized. With the stopping of timer motor 52, indicator lamp 58 is also de-energized showing that the time constant changing process has been completed and that the analyzer is on its final time constant. At this time the chart can be read with its greatest precision because it manifests less jiggle. Those versed in the art will appreciate that more or less than three external capacitors 40, 41, 42 may be used where different time constant steps are desired and that various means other than cams 59, 60, 61 can be employed for controlling the switching relays 46, 47, 48. Also, a separate amplifier, not shown, may accept the output signal from amplifier 25 and pre-charge it for subsequent connection in parallel with capacitor 30 and resistor 26. A further explanation of the invention's operating theory will be set forth in connection with FIG. 2. This figure shows the time constant curves for the various individual capacitors 30, 40, 41 and 42, and the plotted relationship is the output voltage from the analyzing channel with respect to the time that the individual capacitors are connected consecutively across the input of the ratemeter. For example, at time zero, corresponding with initiation of the standardizing procedure or substitution of a new sample in the analyzer, only capacitor 30 is in the time constant circuit and its time constant curve is designated by the numeral 70 in FIG. 2. Disregarding the other curves for the moment, it may be observed that although curve 70 is smooth and continuous, as drawn, the voltage output that prevails swings between a mean line that is curve 70 and a couple of points 71 and 72 which are respectively the maximum and minimum levels of the voltage fluctuation or jiggle. As explained earlier, this jiggle is due to the statistical nature of X-ray production or the random arrival of pulses in the ratemeter. The jiggle is especially pronounced when the time constant is short as when capacitor 30 is the only one in the input circuit. However, it is important that readout of the gage be made possible without waiting for the stability that prevails when the final long time constant is reached so the operator may estimate where the mean of curve 70 lies or he may be satisfied with the determination that the voltage output, and hence the element quantity, lies between limits set by the points 71 and 72.

The second capacitor 40 may be connected in parallel with 30 at a time when its time constant curve 73 has reached a voltage level at the ordinate point 74. It will be recalled that capacitor 40 associated with time constant curve 73 has been pre-charged by connection to the ratemeter output when only capacitor 30 was in the time constant circuit. Thus, when capacitor 40 is connected it may have on it a voltage lying anywhere between points 71 and 72 representative of the voltage on capacitor 30. In other words, the charge actually prevailing on capacitor 40 depends upon the instantaneous charge on capacitor 30 when the former is connected in the circuit so there may be overshoot which is not shown on the curves or which by chance may result in the second capacitor being connected at a time corresponding with the final voltage level 75. It is thus seen, that even though capacitor 40 is connected later in time, its pre-charged value is such as if it were charged by itself from a time beginning with the negative point where the time constant curve 73 intercepts the abscissa of the graph in FIG. 2. It should be realized that consecutive capacitors may charge to the instantaneous voltage prevailing on capacitors that were previously connected in the time constant circuit because there is practically zero impedance between the ratemeter output 27 and ratemeter ground point 29′. In other words, there is no resistance between the ratemeter output and any of the capacitors 40, 41 and 42 when they are pre-charging. The voltage swings existent when capacitor 40 is connected in parallel with 30 are less pronounced as is evident by the minimum and maximum peaks which are designated 75 and 76 in conjunction with time constant curve 73 that is related to capacitors 40 and 30 in combination.

The time constant curve for the addition of capacitor 41 is designated 77. It is connected in the circuit at a time when it may be charged to the voltage value lying between the points 75 and 76. The voltage peaks prevailing when capacitors 30, 40 and 41 are in circuit lie between points 78 and 79 associated with time constant curve 77. Capacitor 41 is again at a voltage level equal to that which it would have had if it had been charged from the time where its curve 77 intersects the abscissa.

The final time constant curve 80 representative of the four capacitors 30, 40, 41, and 42 being connected in parallel is designated by the numeral 80. The last capacitor 42 forming the final combined time constant is again connected at a time when the voltage on the previously connected short time constant capacitors prevails. Meanwhile, the gage output has been readable at approximately the mean voltage value designated by the numeral 75 and it has not been necessary to wait from the time where curve 80 intercepts the abscissa as would be the case if the other capacitors were not connected as explained. It will be seen that the jiggle or voltage output swings, even for a very low pulse arrival rate, which as is incident to analysis of low atomic number elements like silicon and aluminum, is minimal as indicated by the vertical line 81. As the gage continues to operate, even this amount of jiggle is reduced and a nearby straight continuous line is traced on the chart recorder which has the desired precision for easy readability and for precise control of the process provided the signal is being used to feed a computer or other device that controls the process.

An alternative form of the time constant control system may be seen in FIG. 3 where like parts bear the same reference numerals as in FIG. 1. In this circuit, resistance instead of capacitance is changed in order to change the time constant. It will be recalled that the gain of D.C. operational amplifier 25 depends upon the ratio of resistor 26 to resistor 23. On the other hand, the time constant depends on the value of resistor 26 and any resistance in parallel with it taken in conjunction with capacitor 30. Hence, to change the time constant, one may add or subtract resistors such as 91, 93 and 95 which are in parallel with resistor 26. To prevent the amplifier 25 gain from changing with changing time constant, it is also necessary to preserve the ratio between resistors 26 and 23. This may be done by concurrently connecting or disconnecting resistors 91', 93' and 95' which are in parallel with resistor 23.

Each parallel resistor in both groups is in series with a contact such as 90 and 90' in the first paths that are respectively parallel with resistors 26 and 23. For the first step, or shortest time constant, contacts 90, 92 and 94 and their primed counterparts are all closed, resulting in the lowest resistance values for the circuits in parallel with both resistor 26 and resistor 23. This also produces the lowest time constant but results in considerable jiggle of the readout line 12 on chart recorder 13 as before. By proceeding to open contacts 90, 90', and 92, 92', and 94, 94' in pairs, eventually only time constant resistor 26 will be in parallel with capacitor 30 and the longest time constant will prevail.

For simplicity, we may assume that in FIG. 3 the pairs of contacts such as 90 and 90' are opened manually, but those versed in the art will readily perceive how they may be controlled automatically through the synchronous timer motor 52 and their associated cams or other selective devices.

Another alternative, not shown, is to connect a number of resistors in series with resistor 26 and in parallel with capacitor 30 and eliminating the parallel resistors in FIG. 3. With the series arrangement one may place a shunting switch in parallel with each individual resistor and thereby cut resistance in or out in accordance with the desired time constant change schedule. It would also be necessary with this arrangement to place additional resistors in series with resistor 23 and to provide means for connecting more resistors in series with resistor 23 in order that the ratio of resistors 26 and 23, and therefore the amplifier gain would remain constant.

For a better understanding of the principles underlying the invention it may be summarized in reference to FIG. 1 and in contemplation of the error theory involved. Recall that photons are projected randomly by the X-ray tube 11 and that secondary radiation photons are emitted randomly by the sample 10. For light elements like magnesium, aluminum and silicon, randomness of the emitted photons is even more pronounced, or in other words, the X-ray intensities are lower. For these elements the number of pulses arriving on capacitor 19 in the diode pump circuit is low over a short time interval. Because of the random rate of arrival, a short counting interval might yield a count that is above or below the mean value which is taken as an indication of the quantity of an element present. For long counting intervals the randomness is more likely to average out, that is, a number closer to the mean counting rate is more likely to be obtained. Statistical mathematics demonstrates that the standard deviation from the mean count rate is $1/\sqrt{N}$ and the standard counting error is $\sqrt{N}$ where N is the number of counts. It is evident that standard deviation and counting error may be minimized by taking a large number of counts over a longer interval. The matter of counting error is discussed more extensively in H. A. Liebhafsky, H. G. Pfeifer, E. H. Winslow, P. D. Zemany, X-Ray Absorption and Emission in Analytical Chemistry, John Wiley & Sons, Inc., 1960, pages 266–281.

As a concrete example, if the number of counts is 100 over a time interval dependent upon the pulse rate, the probable standard counting error would be $\sqrt{100}=\pm 10$. If 10,000 counts were taken, the probable standard counting error would be $\pm 100$. In the first instance there is a relative standard deviation of 0.1 and in the second 0.01. In accordance with the invention the time constant of the ratemeter integrating circuit, or in reality, of the D.C. operational amplifier is made short in order to allow readout with the best possible initial accuracy, even though the statistical fluctuations are very evident on chart recorder 13, and then the time constant is made longer until a final time constant is reached that yields the desired practical degree of precision and that essentially eliminates statistical fluctuations. Thus, after standardizing or after substituting samples in the analyzer, the invention permits the analyzer to be usefully readout without waiting for ultimate stability and precision that attends use of the final time constant.

Although preferred and alternative embodiments of the invention have been described, such description is to be interpreted as illustrative rather than limiting, for the invention may be variously embodied and its true scope and spirit is to be determined by construction of the claims which follow.

It is claimed:

1. In an instrument utilizing radiation to measure a characteristic of a test sample, a primary radiation source, means for detecting radiation quanta emanating at a statistically fluctuating rate from the sample whose emanations are effected by the primary radiation from the source, said detecting means including means for converting said quanta to electric input signals, amplifier means in circuit with a cooperating integrating circuit, said amplifier means receiving said input signals and raising the same to a higher level output signal, said integrating circuit including components having certain resistive and capacitive values which have a time constant that results in said output signal exhibiting comparatively wide fluctuations during a first integrating interval, means for pre-charging one of said capacitive components from the amplifier output to a level substantially that of the amplifier output signal during a first integrating interval, a timer means and switch means responsive thereto for connecting said pre-charged capacitive component in parallel with a resistive component at the end of a predetermined interval, whereby the time constant is increased and fluctuations in the electric output signal are reduced.

2. In an instrument utilizing radiation to measure a characteristic of a test sample, a radiation source and a detector means for receiving statistically fluctuating radiation quanta emanating from the sample when excited by radiation from the source, said detector means producing electric pulses in accordance with the rate of arrival of the quanta, a ratemeter for integrating said pulses and producing an output voltage that is an analog of the pulse rate, said ratemeter having input and output terminals, an integrating RC time constant circuit having resistor means and capacitor means connectable in parallel with each other and at least one capacitor having a side that is connected to a point whose voltage is representative of the voltage at one output terminal, said capacitor having its other side alternately connectable through separate paths to a point representative of the voltage at the other output terminal or to an input terminal, a switch means adapted to first sequentially close a path to the one output terminal point for pre-charging the capacitor and to secondly close a path that places the capacitor in parallel with said resistor means and connects the capacitor's other side to an input terminal to integrate from a pre-charged condition, whereby statistical fluctuations in the output signal voltage are continually reduced.

3. The invention according to claim 2 including a timer means and means controlled by said timer means to operate said switch means after a predetermined interval.

4. The invention according to claim 3 wherein said timer means includes a motor means and a plurality of concurrently rotated cam means driven by the motor means, a second switch means operably coupled with each said cam means, a plurality of capacitors connectable similarly to the said one capacitor, said second switch means controlling said first switch means to successively transfer said capacitors from their pre-charging path to their integrating path until all capacitors are in the integrating path, whereby a long RC time constant results, and means to de-energize said timer means when all capacitors are in the integrating path.

5. For use in an instrument utilizing radiation to measure a characteristic of a test sample, a ratemeter that counts electric pulses of one polarity corresponding with the rate of radiation quanta arrival and converts the pulses to a continuous electric signal representative of the pulse rate, a D.C. amplifier having input and output terminals, an RC time constant circuit for receiving said pulses and integrating the same, said circuit being connectable between the input and output of said amplifier, said circuit including a resistor means and plural capacitors connectable in parallel therewith, said switch means having alternate positions in one of which a capaciitor in its associated circuit may be connected for being pre-charged to a voltage that is representative of that at the output terminal and the other of which positions the capacitor is connected between the input and output terminals of the amplifier for integrating with the capacitor in a pre-charged condition.

6. The invention of claim 5 including a timer means, means operated by said timer means to consecutively switch said switch means and thereby switch capacitors in their pre-charged condition to the parallel integrating circuit.

7. In an instrument utilizing radiation to measure a characteristic of a test sample, a primary radiation source, means for detecting radiation quanta emanating at a fluctuating rate from the sample whose emanations are effected by the primary radiation received from the source, said detecting means including means for converting said quanta to electric input signals, means for integrating said input signals to develop an electric output signal whose magnitude is representative of the quantum rate, said integrating means including amplifier means having input and output terminals, a capacitor connected between the terminals and a resistive circuit including a plurality of resistors connectable in steps in a circuit that is parallel with the capacitor, the first step of resistance in combination with the capacitor producing a short time constant that results in the electric output signal voltage exhibiting comparatively wide fluctuations within a pre-determined range during a first integrating interval, switch means adapted to switch resistors sequentially to thereby increase the resistance in parallel with the capacitor while the capacitor voltage remains within the pre-determined range and to increase the time constant and reduce the fluctuations, and means for operating the switch means at predetermined intervals.

8. The invention according to claim 7 wherein the amplifier means includes a chopper amplifier and a D.C. operational amplifier, resistor means in the input circuit to the chopper amplifier, switch means for controlling the amount of the last named resistor means resistance in correspondence with switching of resistors in the time constant resistor and capacitor combination aforesaid, whereby the gain of the amplifier means remains constant for each time constant step.

9. In an instrument that employs radiation to measure a characteristic of a sample, the combination of:

(a) a primary radiation source from which radiation may be projected onto the sample,
(b) a detector for receiving radiation quanta that emanates from the sample at a statistically fluctuating rate and for converting the same to an electric signal that fluctuates correspondingly,
(c) an integrating circuit that is adapted to receive the electric signal from the detector and to convert the same to an output signal the magnitude of which fluctuates over a range during a first integrating interval and is indicative of the quanta rate and is a measure of the characteristic,
(d) said integrating circuit including a capacitor and a resistor which have values the product of which yields a predetermined time constant and which capacitor charges to a voltage within a statistically fluctuating range during the first interval, and
(e) means that are adapted to increase the product of the capacitor and resistor values sequentially to initiate subsequent integrating intervals with the voltage on the capacitor within the statistical fluctuation range of the preceding interval.

10. In an instrument that employs radiation to measure a characteristic of a sample, the combination of:

(a) a primary radiation source from which radiation may be projected onto the sample,
(b) a detector for receiving radiation quanta that emanates from the sample at a statistically fluctuating rate and for converting the same to an electric signal that fluctuates correspondingly,
(c) an integrating circuit that is adapted to receive the electric signal from the detector and to convert the same to an output signal the magnitude of which fluctuates over a range during a first integrating interval and is indicative of the quanta rate and is a measure of the characteristic,
(d) said integrating circuit including a resistor and a plurality of capacitors adapted to be connected in parallel therewith,
(e) one of said capacitors being in circuit for charging to a statistically fluctuating voltage value during a first integrating interval which has a relatively short time constant,
(f) another of said capacitors being pre-charged in one place in said circuit to a value lying within the statistical fluctuation range of the said one capacitor during the first interval,
(g) switch means that are in circuit with the capacitors and adapted to switch the pre-charged capacitor into parallel with the one capacitor to thereby initiate a second integrating interval of relatively longer time constant and smaller statistical fluctuations.

References Cited by the Examiner

UNITED STATES PATENTS 2,951,161   8/60   Foster et al. _____ 250—83.3 X
3,000,438   9/61   Alexander _____ 250—83.3 X

References Cited by the Applicant

UNITED STATES PATENTS 2,675,734   4/54   Hasler et al.

RALPH G. NILSON, *Primary Examiner.*

ARCHIE R. BORCHELT, *Examiner.*